US012078990B2

(12) United States Patent
Stenneth (10) Patent No.: US 12,078,990 B2
(45) Date of Patent: Sep. 3, 2024

(54) METHOD, APPARATUS AND COMPUTER PROGRAM PRODUCT FOR IDENTIFYING ROAD WORK WITHIN A ROAD NETWORK

(71) Applicant: HERE GLOBAL B.V., Eindhoven (NL)

(72) Inventor: Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 215 days.

(21) Appl. No.: 17/455,326

(22) Filed: Nov. 17, 2021

(65) Prior Publication Data

US 2023/0152800 A1 May 18, 2023

(51) Int. Cl.
*G05D 1/00* (2006.01)
*B60W 60/00* (2020.01)
*G01C 21/00* (2006.01)
*G01C 21/34* (2006.01)
*G08G 1/01* (2006.01)

(52) U.S. Cl.
CPC ....... *G05D 1/0061* (2013.01); *B60W 60/0053* (2020.02); *G01C 21/3461* (2013.01); *G01C 21/38* (2020.08); *G05D 1/0214* (2013.01); *G08G 1/0108* (2013.01); *B60W 2552/50* (2020.02); *B60W 2555/60* (2020.02)

(58) Field of Classification Search
CPC ............... G05D 1/0061; G05D 1/0214; G05D 2201/0213; B60W 60/0053; B60W 2552/50; B60W 2555/60; G01C 21/3461; G01C 21/38; G01C 21/3841; G01C 21/3815; G08G 1/0108; G08G 1/0112; G08G 1/0129; G08G 1/0133; G08G 1/09623

See application file for complete search history.

(56) References Cited

U.S. PATENT DOCUMENTS

| 8,996,228 B1 | 3/2015 | Ferguson et al. |
| 9,141,107 B2 | 9/2015 | Ferguson et al. |
| 10,282,999 B2 | 5/2019 | Creusot |

(Continued)

OTHER PUBLICATIONS

Kunz et al., "Automated Detection of Construction Sites on Motorways", IEEE Intelligent Vehicles Symposium, (Jun. 2017), 8 pages.

*Primary Examiner* — Abdalla A Khaled
(74) *Attorney, Agent, or Firm* — Jeffrey R. Moisan; HERE GLOBAL B.V.

(57) ABSTRACT

Embodiments described herein may provide a method for using vehicle sensor data to identify where road work exists within a road network. Methods may include: receiving probe data and sensor data from a plurality of probe apparatuses traveling along a sequence of road segments; identifying, from the sensor data, one or more indicators of a beginning of a road work area; identifying, from the sensor data, binary indicators of the presence of road work or a lack of presence of road work along the sequence of road segments; and determining, based on the one or more indicators of a beginning of a road work area and the binary indicators of the presence of road work or the lack of road work along the sequence of road segments, a probability of road work occurring along one or more road segments of the sequence of road segments.

5 Claims, 4 Drawing Sheets

(56) References Cited

U.S. PATENT DOCUMENTS

| | | | |
|---|---|---|---|
| 2014/0063232 A1* | 3/2014 | Fairfield | B60T 7/12 |
| | | | 382/104 |
| 2014/0067187 A1* | 3/2014 | Ferguson | B60W 60/0011 |
| | | | 701/28 |
| 2014/0309833 A1* | 10/2014 | Ferguson | G06V 20/582 |
| | | | 701/23 |
| 2015/0266471 A1* | 9/2015 | Ferguson | B60W 30/0956 |
| | | | 701/1 |
| 2015/0266472 A1* | 9/2015 | Ferguson | G06V 20/58 |
| | | | 701/1 |
| 2016/0046290 A1* | 2/2016 | Aharony | B60W 10/20 |
| | | | 701/41 |
| 2017/0242436 A1* | 8/2017 | Creusot | G08G 1/09626 |
| 2018/0268698 A1* | 9/2018 | Michalakis | G08G 1/0112 |
| 2018/0315305 A1* | 11/2018 | Thelen | G07C 5/08 |
| 2018/0365507 A1* | 12/2018 | Hackeloeer | G06F 16/29 |
| 2019/0072404 A1* | 3/2019 | Alawieh | G01C 21/3837 |
| 2019/0325349 A1 | 10/2019 | Zhang et al. | |
| 2019/0362159 A1* | 11/2019 | Cooley | G06V 10/82 |
| 2020/0042807 A1* | 2/2020 | Schutzmeier | G06V 20/582 |
| 2020/0105134 A1* | 4/2020 | Pietrobon | G08G 1/0133 |
| 2020/0149897 A1* | 5/2020 | Xiong | G05D 1/0274 |
| 2020/0192386 A1 | 6/2020 | Stenneth | |
| 2021/0348930 A1* | 11/2021 | Johnson, Jr. | G01C 21/3841 |
| 2021/0350817 A1 | 11/2021 | Young et al. | |
| 2021/0375305 A1 | 12/2021 | Stenneth et al. | |
| 2022/0057216 A1 | 2/2022 | Zhang et al. | |

\* cited by examiner

METHOD, APPARATUS AND COMPUTER PROGRAM PRODUCT FOR IDENTIFYING ROAD WORK WITHIN A ROAD NETWORK

TECHNOLOGICAL FIELD

An example embodiment of the present invention relates generally to detecting and identifying road work, and more particularly, to a method, apparatus, and computer program product for using vehicle sensor data to identify where road work exists within a road network.

BACKGROUND

Digital maps provide a detailed view of a road network and enable users to navigate among the road network with relative ease. Further, dynamic information such as traffic can provide additional details that help drivers navigate the road network efficiently. Beyond traffic, there are other factors that influence travel within a road network. Various hazard identification systems exist to identify potentially hazardous conditions such as road work conditions in a road network. Municipalities may publish road work events that can be used by traffic services and map data services to caution drivers of road work. These road work events generally involve little detail and often include tentative, planned schedules where the schedules may not account for various events that may impact scheduling.

Road work details within map data may not be temporally relevant, and may lag actual events due to the refresh rate of map data. Further, the dynamic nature of road work events presents challenges to map data service providers.

BRIEF SUMMARY

A method, apparatus, and computer program product are therefore provided for detecting and identifying road work, and more particularly, to a method, apparatus, and computer program product for using vehicle sensor data to identify where road work exists within a road network. An apparatus may be provided including at least one processor and at least one non-transitory memory including computer program code instructions, the computer program code instructions may be configured to, when executed, cause the apparatus to at least: receive probe data from a plurality of probe apparatuses traveling along a sequence of road segments; receive sensor data associated with the probe data, where the sensor data includes data captured by sensors of the probe apparatuses along the sequence of road segments; identify, from the sensor data, one or more indicators of a beginning of a road work area; identify, from the sensor data, binary indicators of the presence of road work or a lack of presence of road work along the sequence of road segments; and determine, based on the one or more indicators of a beginning of a road work area and the binary indicators of the presence of road work or the lack of road work along the sequence of road segments, a probability of road work occurring along one or more road segments of the sequence of road segments.

According to some embodiments, causing the apparatus to determine, based on the one or more indicators of a beginning of a road work area and the binary indicators of the presence of road work or the lack of road work along the sequence of road segments, a probability of road work occurring along the one or more road segments of the sequence of road segments includes causing the apparatus to determine, based on a proportion of the binary indicators of the presence of road work or the lack of road work along the at least one road segment of the sequence of road segments indicating the presence of road work satisfying a predetermined threshold, a relatively high probability of road work occurring along the at least one road segment. According to certain embodiments, causing the apparatus to determine, based on the one or more indicators of a beginning of a road work area and the binary indicators of the presence of road work or the lack of road work along the sequence of road segments, a probability of road work occurring along the one or more road segments of the sequence of road segments includes causing the apparatus to determine, based on a number of the one or more indicators of the beginning of the road work area satisfying a predetermined threshold relative to a total number of observations, a location of the beginning of the road work area along the sequence of road segments.

According to some embodiments, the one or more indicators of the beginning of the road work area include one or more of: a static sign, a variable sign, a construction cone, a construction barrel, or a construction barricade. According to some embodiments, the apparatus is further caused to provide an indication of the probability of road work occurring along the one or more road segments of the sequence of road segments for at least one of navigational assistance or at least semi-autonomous vehicle control. According to certain embodiments, causing the apparatus to provide the indication of the probability of road work occurring along the one or more road segments of the sequence of road segments for at least one of navigational assistance or at least semi-autonomous vehicle control includes: causing the apparatus to provide the indication of the probability of road work occurring along the one or more road segments of the sequence of road segments for at least semi-autonomous vehicle control; and causing an autonomous vehicle to cede control of the vehicle to a driver based on the indication of the probability of road work occurring along the one or more road segments of the sequence of road segments satisfying a predetermined threshold. The apparatus of certain embodiments is further caused to determine a confidence of road work occurring along the one or more road segments of the sequence of road segments based on the probability of road work occurring along the one or more road segments of the sequence of road segments and a time decay factor since the sensor data was collected.

Embodiments provided herein include a computer program product including at least one non-transitory computer-readable storage medium having computer-executable program code instructions stored therein, the computer-executable program code instructions including program code instructions to: receive probe data from a plurality of probe apparatuses traveling along a sequence of road segments; receive sensor data associated with the probe data, where the sensor data includes data captured by sensors of the probe apparatuses along the sequence of road segments; identify, from the sensor data, one or more indicators of a beginning of a road work area; identify, from the sensor data, binary indicators of the presence of road work or a lack of presence of road work along the sequence of road segments; and determine, based on the one or more indicators of a beginning of a road work area and the binary indicators of the presence of road work or the lack of road work along the sequence of road segments, a probability of road work occurring along one or more road segments of the sequence of road segments.

According to some embodiments, the program code instructions to determine, based on the one or more indicators of a beginning of a road work area and the binary indicators of the presence of road work or the lack of road work along the sequence of road segments, a probability of road work occurring along the one or more road segments of the sequence of road segments includes program code instructions to determine, based on a proportion of the binary indicators of the presence of road work or the lack of road work along the at least one road segment of the sequence of road segments indicating the presence of road work satisfying a predetermined threshold, a relatively high probability of road work occurring along the at least one road segment. According to certain embodiments, the program code instructions to determine, based on the one or more indicators of a beginning of a road work area and the binary indicators of the presence of road work or the lack of road work along the sequence of road segments, a probability of road work occurring along the one or more road segments of the sequence of road segments includes program code instructions to determine, based on a number of the one or more indicators of the beginning of the road work area satisfying a predetermined threshold relative to a total number of observations, a location of the beginning of the road work area along the sequence of road segments.

According to some embodiments, the one or more indicators of the beginning of the road work area include one or more of: a static sign, a variable sign, a construction cone, a construction barrel, or a construction barricade. According to some embodiments, the computer program product further includes program code instructions to provide an indication of the probability of road work occurring along the one or more road segments of the sequence of road segments for at least one of navigational assistance or at least semi-autonomous vehicle control. According to certain embodiments, the program code instructions to provide the indication of the probability of road work occurring along the one or more road segments of the sequence of road segments for at least one of navigational assistance or at least semi-autonomous vehicle control includes program code instructions to: provide the indication of the probability of road work occurring along the one or more road segments of the sequence of road segments for at least semi-autonomous vehicle control; and cause an autonomous vehicle to cede control of the vehicle to a driver based on the indication of the probability of road work occurring along the one or more road segments of the sequence of road segments satisfying a predetermined threshold. The computer program product of certain embodiments further comprises program code instructions to determine a confidence of road work occurring along the one or more road segments of the sequence of road segments based on the probability of road work occurring along the one or more road segments of the sequence of road segments and a time decay factor since the sensor data was collected.

Embodiments provided herein include a method including: receiving probe data from a plurality of probe apparatuses traveling along a sequence of road segments; receiving sensor data associated with the probe data, where the sensor data includes data captured by sensors of the probe apparatuses along the sequence of road segments; identifying, from the sensor data, one or more indicators of a beginning of a road work area; identifying, from the sensor data, binary indicators of the presence of road work or a lack of presence of road work along the sequence of road segments; and determining, based on the one or more indicators of a beginning of a road work area and the binary indicators of the presence of road work or the lack of road work along the sequence of road segments, a probability of road work occurring along one or more road segments of the sequence of road segments.

According to some embodiments, determining, based on the one or more indicators of a beginning of a road work area and the binary indicators of the presence of road work or the lack of road work along the sequence of road segments, a probability of road work occurring along the one or more road segments of the sequence of road segments includes determining, based on a proportion of the binary indicators of the presence of road work or the lack of road work along the at least one road segment of the sequence of road segments indicating the presence of road work satisfying a predetermined threshold, a relatively high probability of road work occurring along the at least one road segment. According to certain embodiments, determining, based on the one or more indicators of a beginning of a road work area and the binary indicators of the presence of road work or the lack of road work along the sequence of road segments, a probability of road work occurring along the one or more road segments of the sequence of road segments includes determining, based on a number of the one or more indicators of the beginning of the road work area satisfying a predetermined threshold relative to a total number of observations, a location of the beginning of the road work area along the sequence of road segments.

According to some embodiments, the one or more indicators of the beginning of the road work area include one or more of: a static sign, a variable sign, a construction cone, a construction barrel, or a construction barricade. According to some embodiments, the method further includes providing an indication of the probability of road work occurring along the one or more road segments of the sequence of road segments for at least one of navigational assistance or at least semi-autonomous vehicle control. According to certain embodiments, providing the indication of the probability of road work occurring along the one or more road segments of the sequence of road segments for at least one of navigational assistance or at least semi-autonomous vehicle control includes: providing the indication of the probability of road work occurring along the one or more road segments of the sequence of road segments for at least semi-autonomous vehicle control; and causing an autonomous vehicle to cede control of the vehicle to a driver based on the indication of the probability of road work occurring along the one or more road segments of the sequence of road segments satisfying a predetermined threshold. The method of certain embodiments further includes determining a confidence of road work occurring along the one or more road segments of the sequence of road segments based on the probability of road work occurring along the one or more road segments of the sequence of road segments and a time decay factor since the sensor data was collected.

Embodiments provided herein include an apparatus including: means for receiving probe data from a plurality of probe apparatuses traveling along a sequence of road segments; means for receiving sensor data associated with the probe data, where the sensor data includes data captured by sensors of the probe apparatuses along the sequence of road segments; means for identifying, from the sensor data, one or more indicators of a beginning of a road work area; means for identifying, from the sensor data, binary indicators of the presence of road work or a lack of presence of road work along the sequence of road segments; and means for determining, based on the one or more indicators of a beginning of a road work area and the binary indicators of the presence of road work or the lack of road work along the sequence of road segments, a probability of road work occurring along one or more road segments of the sequence of road segments.

According to some embodiments, the means for determining, based on the one or more indicators of a beginning of a road work area and the binary indicators of the presence of road work or the lack of road work along the sequence of road segments, a probability of road work occurring along the one or more road segments of the sequence of road segments includes means for determining, based on a proportion of the binary indicators of the presence of road work or the lack of road work along the at least one road segment of the sequence of road segments indicating the presence of road work satisfying a predetermined threshold, a relatively high probability of road work occurring along the at least one road segment. According to certain embodiments, the means for determining, based on the one or more indicators of a beginning of a road work area and the binary indicators of the presence of road work or the lack of road work along the sequence of road segments, a probability of road work occurring along the one or more road segments of the sequence of road segments includes means for determining, based on a number of the one or more indicators of the beginning of the road work area satisfying a predetermined threshold relative to a total number of observations, a location of the beginning of the road work area along the sequence of road segments.

According to some embodiments, the one or more indicators of the beginning of the road work area include one or more of: a static sign, a variable sign, a construction cone, a construction barrel, or a construction barricade. According to some embodiments, the apparatus further includes means for providing an indication of the probability of road work occurring along the one or more road segments of the sequence of road segments for at least one of navigational assistance or at least semi-autonomous vehicle control. According to certain embodiments, the means for providing the indication of the probability of road work occurring along the one or more road segments of the sequence of road segments for at least one of navigational assistance or at least semi-autonomous vehicle control includes: means for providing the indication of the probability of road work occurring along the one or more road segments of the sequence of road segments for at least semi-autonomous vehicle control; and means for causing an autonomous vehicle to cede control of the vehicle to a driver based on the indication of the probability of road work occurring along the one or more road segments of the sequence of road segments satisfying a predetermined threshold. The apparatus of certain embodiments further includes means for determining a confidence of road work occurring along the one or more road segments of the sequence of road segments based on the probability of road work occurring along the one or more road segments of the sequence of road segments and a time decay factor since the sensor data was collected.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present invention in general terms, reference will hereinafter be made to the accompanying drawings which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for aggregating sensor data from a plurality of vehicles to identify where road work exists within a road network. In this regard, according to certain embodiments, user interface of a device, such a mobile device or a device affixed to a vehicle, such as to a dashboard or the like, may provide work zone warnings to a user, which may aid the user in navigation or driving in an instance in which the user is traveling by vehicle. According to other embodiments described herein, road work is identified along road segments of a road network through the aggregation of sensor data from vehicles traveling along the road segments of the road network. Further, a probability of the presence of road work is established to more reliably and repeatably indicate the presence of road work.

A work zone, as described herein, includes an area within which work or construction is being performed that affects, in at least one manner, travel along a road segment. Work or construction need not be actively occurring (e.g., work crews on-site) for a work zone to be considered a work zone. Further, the work or construction that is being performed need not be on a road along which a work zone is defined, as work performed proximate a road segment may affect a road segment sufficiently for the road segment to be identified as having a work zone along the road segment. For example, while work may be performed on a shoulder of a road or even on a building or landscape adjacent to a road segment, the road segment may be impacted by the work. With workers operating adjacent to a road segment, vehicle speeds may be reduced along the road segment to safeguard the workers and increase driver awareness in the area.

Because of the dynamic nature of work zones, and road work events that involve work zones, such work zones may not be adequately represented within map data that is updated periodically. Some work zones occur only during certain times of day, while others can be persistent for months. Further, the way in which road segments are affected by work zones can change frequently. For example, in some instances, work zone speed limits may only be present during such time as workers are present. Work zones may change the number and position of open lanes along a road segment. For these reasons, conventional map data is not well equipped to handle regularly changing work zones and the details thereof that impact traffic flow, routing, and autonomous vehicle control around the area of the work zone.

Provided herein is a method, apparatus, and computer program product to detect and identify road work using aggregated vehicle sensor data to identify where road work exists within a road network and a probability associated with the likelihood of road work actually existing at the location within the road network. Once the road work has been identified, the affected region can be determined. Using the sensor data and underlying map data to determine the affected driving lane and other map attributes that can impact vehicle navigation and autonomous vehicle control. Embodiments provided herein include an algorithm employed to use sensor data aggregated from vehicles traveling along a road network to accurately and repeatably establish where road work is occurring. The location of road work can be communicated to travelers within the road network to take necessary precautions or to avoid road work as appropriate. A driver of a vehicle using navigational assistance or an autonomous vehicle itself can determine how to proceed based on the presence of road work and a probability thereof. An autonomous vehicle, for example, may determine that manual driving is necessary such that vehicle control is handed off to a driver. Alternatively, an autonomous vehicle can determine a best path through the area in which road work is present and proceed accordingly employing any work zone specific requirements, such as lower speed limits, no passing, etc.

As described herein, example embodiments of the claims detect and identify road work along road segments of a road network. The presence of road work and the location thereof may be provided to a user via any available device, such as a mobile phone, tablet computer, fixed computer (e.g., desktop computer), or the like. Optionally, the road work information (e.g., the road work location, probability of the road work presence) may be provided to autonomous or semi-autonomous vehicle controls to aid the autonomous controls in providing safe travel along a road network where road work exists. One example embodiment that will be described herein includes a user device of a user traveling in a vehicle. Such a device may be a mobile personal device that a user may use within a vehicle and outside of a vehicle environment, while other devices may include a vehicle navigation system. In some embodiments, the mobile personal device may double as a vehicle navigation system.

While the term "navigation system" is used herein to describe a device used to present map data, traffic data, etc., it is to be appreciated that such a navigation system can be used via a user interface without providing route guidance information. Route guidance is provided in response to a user entering a desired destination, and where a route between the origin or current location of a user and the destination is mapped and provided to the user. A navigation system may be used in the absence of a discrete destination to provide driver assistance and information. For example, as a user travels within a road network, a driver may be made aware of an upcoming road work such that they can take any necessary precautions, or avoid the area altogether.

In example embodiments, a navigation system user interface may be provided for driver assistance for a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like.

Autonomous and semi-autonomous vehicles are classified according to the Society of Automotive Engineers (SAE) to include six distinct levels of autonomy ranging from Level 0 to Level 5. In Level 0, a vehicle may provide warnings and may momentarily intervene (e.g., anti-lock braking or stability control), but has no sustained vehicle control. Level 1 autonomy includes a "hands on" control, where the driver and the automated system share control of the vehicle. Examples include adaptive cruise control (ACC) where the driver controls steering and the automated system controls speed. The driver must be ready to retake full control at any time with Level 1 autonomy. Level 2 autonomy is "hands off" control, where the system takes full control of the vehicle including accelerating, braking, and steering. The driver must monitor the driving and be prepared to intervene at any time if the automated system fails to respond properly. A driver may be required to maintain hands on a steering wheel in this level of autonomy despite the name as the driver must be ready to intervene when appropriate.

Level 3 vehicle autonomy includes "eyes off" whereby a driver can safely turn their attention away from the driving tasks. For example, a driver of a Level 3 autonomous vehicle can watch a movie or use a mobile device. While the vehicle will handle situations that call for immediate response like emergency braking, the driver must be prepared to intervene within some limited time specified by the manufacturer when called upon to do so. Level 4 autonomous control requires no driver attention for safety and a driver can even leave a driver's seat. Self-driving is supported only in limited spatial areas that may be geofenced or under special circumstances, like traffic jams. Level 5 autonomy is "steering wheel optional" autonomy. This includes true driverless vehicles that do not require a human.

Autonomous and semi-autonomous vehicles may use HD maps and an understanding of the context (e.g., traffic, weather, road construction, etc.) to help navigate and to control a vehicle along its path. In an instance in which a vehicle is subject to complete or partial autonomous control, hazard warnings associated with a work zone defining a geographic area in which a road work is determined to exist may inform the vehicle enabling appropriate actions to be taken. Those actions may include re-routing to avoid or partially avoid the road work, or to alter the operational state of the vehicle according to the road work. Such operational state adjustments may include transitioning from autonomous control to manual control of the vehicle, increasing a sensor refresh rate in anticipation of potential rapid changes in the environment, or the like.

Figure 1:
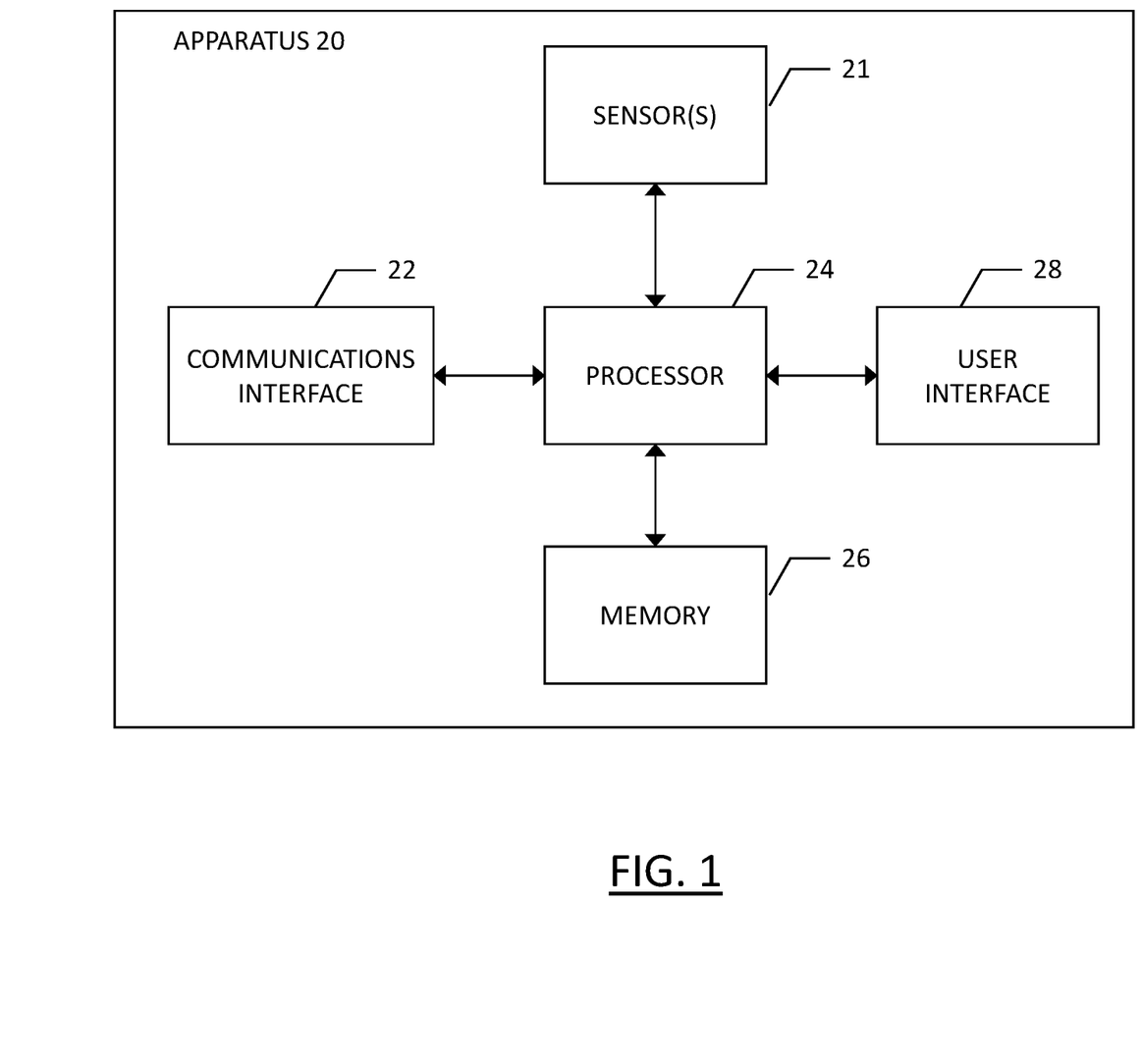
FIG. 1 is a block diagram of an apparatus according to an example embodiment of the present disclosure.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for aggregating sensor data to detect road work and generating, from the road work, an indication of the road work presence along one or more road segments of a road network to inform navigational systems and autonomous vehicles. For example, the computing device may be a mobile terminal, such as a personal digital assistant (PDA), mobile telephone, smart phone, personal navigation device, smart watch, tablet computer, camera, or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), Light Distancing and Ranging (LiDAR) sensor, humidity sensor, image capture sensor, precipitation sensor, accelerometer, and/or gyroscope. Any of the sensors may be used to sense information regarding the movement, positioning, or orientation of the device and for determining a weather condition at the location of the device as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 26, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

According to certain embodiments, the apparatus 20 may support a mapping or navigation application so as to present maps or otherwise provide navigation or driver assistance. In order to support a mapping application, the computing device may include or otherwise be in communication with a geographic database, such as may be stored in memory device 26. For example, the geographic database includes node data records, road segment or link data records, point of interest (POI) data records, and other data records. More, fewer, or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a user device user interface and/or navigation system user interface may be provided to provide information or driver assistance to a user traveling along a network of roadways. Devices and systems may receive an indication of a current location of the user, and any location based warnings such as road work associated with the current location of the device and user. While a service provider may be specifically configured to provide location-based information to a user, such a service may be enhanced or improved through cooperation with other service providers that independently determine location based warnings and work zone areas.

Figure 2:
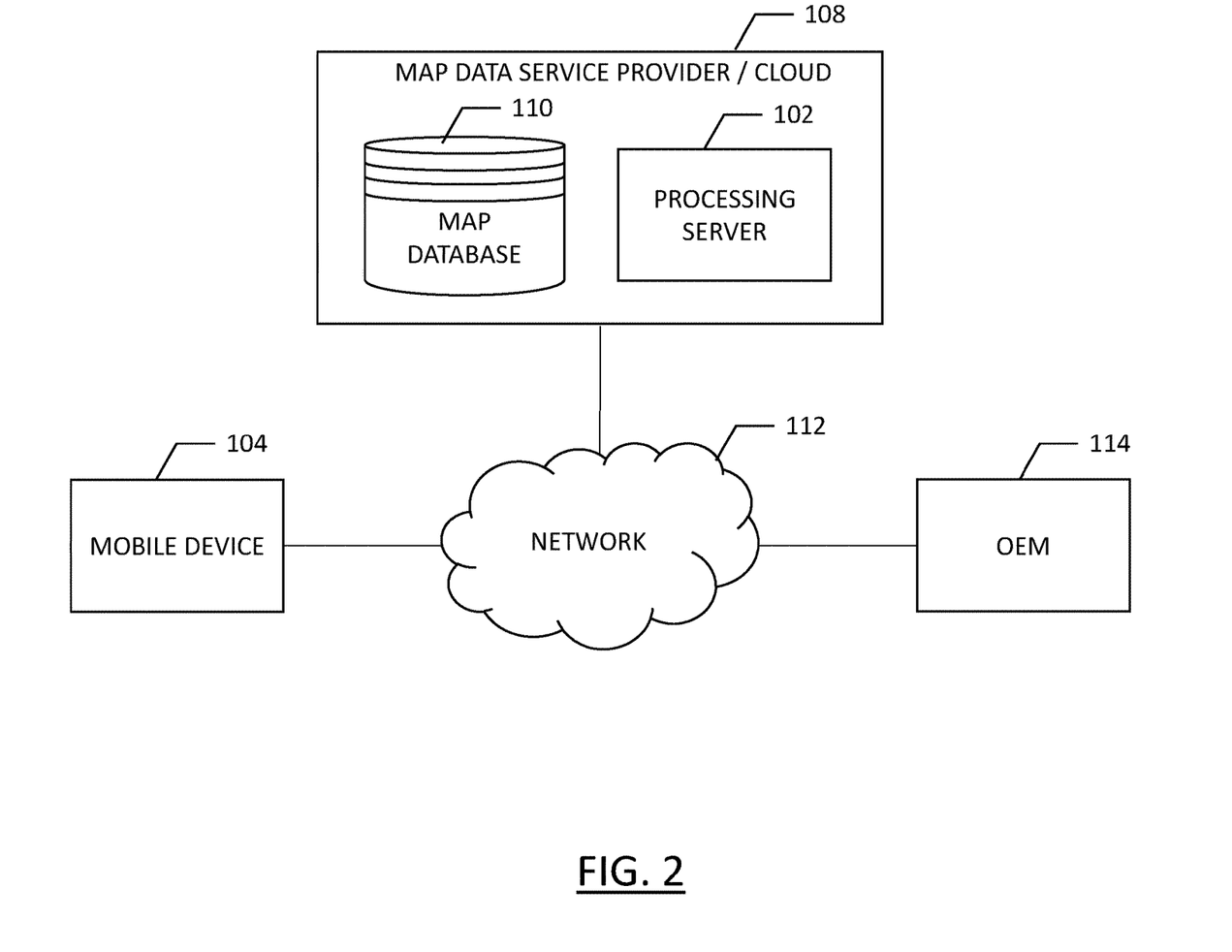
FIG. 2 is a block diagram of a system for using sensor data to identify where road work exists within a road network according to an example embodiment of the present disclosure.

According to example embodiments, map service provider database may be used to provide driver assistance via a navigation system or in conjunction with autonomous vehicle control. FIG. 2 illustrates a communication diagram of an example embodiment of a system for implementing example embodiments described herein using a navigation system and a map data service provider. The illustrated embodiment of FIG. 2 includes a mobile device 104, which may be, for example, the apparatus 20 of FIG. 1, such as a mobile phone, an in-vehicle navigation system, or the like, an original equipment manufacturer (OEM) 114, and a map data service provider or cloud service 108. Each of the mobile device 104, OEM 114, and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The OEM 114 may include a server and a database configured to receive probe data from vehicles or devices corresponding to the OEM. For example, if the OEM is a brand of automobile, each of that manufacturer's automobiles (e.g., mobile device 104) may provide probe data to the OEM 114 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 104 may be such a subscriber. While depicted as an OEM 114 in FIG. 2, other entities may function in the same manner described herein with respect to the OEM. As such, the OEM 114 illustrated in FIG. 2 is not limited to original equipment manufacturers, but may be any entity participating as described herein with respect to the OEMs.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data or location-based road work event data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region. These vehicles or probes may be embodied by mobile device 104 and may provide data to the map data service provider in the form of traffic speed/congestion data, weather information, location, speed, direction, etc.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

The OEM 114 may be configured to access the map database 110 via the processing server 102 through, for example, a mapping application, such that the user equipment may provide navigational assistance to a user among other services provided through access to the map data service provider 108. According to some embodiments, the map data service provider 108 may function as the OEM, such as when the map data service provider is a service provider to OEMs to provide map services to vehicles from that OEM. In such an embodiment, map data service provider 108 may or may not be the recipient of vehicle probe data from the vehicles of that manufacturer. Similarly, the map data service provider 108 may provide services to mobile devices, such as a map services provider that may be implemented on a mobile device, such as in a mapping application. According to such an embodiment, the map data service provider 108 may function as the OEM as the map developer receives the probe data from the mobile devices of users as they travel along a road network.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features.

In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments. An embodiment implemented as an ADAS may at least partially control autonomous or semi-autonomous features of a vehicle with the assistance of establishing the vehicle.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Driver assistance information may be communicated to a user via a display, such as a display of user interface 28 of apparatus 20 of FIG. 1. The display may be a display of a mobile phone, or a screen of an in-vehicle navigation system, for example. In the presentation of the driver assistance information to the user it is important that the information is communicated clearly and in an easily understood manner such that a user may quickly understand the information presented. As a user of a navigation system may be driving a vehicle, it is important that the navigation information including driver assistance information is quickly and easily understood, without requiring substantial user interaction should additional information be needed by the driver.

Map information and dynamic content is provided in some embodiments by service providers, such as map data service provider 108 of FIG. 1. These services collect sensor data from connected vehicles and aggregated the collected sensor data to build high definition (HD) maps with road segment resolution down to, in some embodiments, centimeters, for an ADAs system to support autonomously controlled vehicles. The sensor data collected from vehicles traveling within the road network includes LiDAR, radar, ultrasonic sensors, cameras, geolocation, etc. Generally, ADAS dynamic content services include real time traffic, hazard warning, road signs, safety cameras, on-street parking, etc. Using backend sensor data and advanced wireless technologies (e.g., 4G and/or 5G or subsequent iterations), autonomous vehicle control can be improved through greater awareness of dynamic environmental factors.

Example embodiments provided herein provide a method of using sensor data from vehicles traveling within a road network to identify where road work exists within the road network. Embodiments further determine a probability with which road work exists in the locations identified. This probability reflects a likelihood of road work occurring at the location. Based on the identified road work, an indication of the road work and the impact on the road segments along which the road work is occurring can be communicated to vehicles traveling within the road network to inform navigational systems and autonomous vehicles. Mobile devices, such as mobile device 104 may be associated with a particular service provider (e.g., OEM 114 and/or map data service provider 108) where dynamic information such as road work and locations thereof are communicated from that particular service provider to the mobile device, and used by the mobile device to present relevant information on a user interface and/or to inform vehicle automation regarding areas where a road work is determined to exist.

Embodiments described herein provide an algorithm that uses aggregated sensor data to accurately identify where road work exists within a road network and the probability associated with the road work. Once the road work has been identified through the aggregated probe data, the affected road segments is identified. The affected road segments define the work zone associated with the road work. Embodiments detect road work using sensor data from vehicles traveling within a road network. Using this data, the road work location and start/end time can be determined. Using the road work location and start/end times, embodiments can identify where and when vehicular travel can be affected. Vehicles that are driven by a person can receive an indication of the road work, such as when the vehicle is approaching the road work, or the road work lies along a route that is being driven. The person driving the vehicle can take any necessary precautions, such as slowing down or avoiding the road work. Autonomous or semi-autonomous vehicles can receive an indication of the road work and take any necessary precautions automatically. For example, an autonomous vehicle may slow for road work, change lanes, or determine that autonomous control is not recommended and cede control to a driver for the duration of the road work.

Algorithms for determining where road work exists as described herein consider two primary types of data. The first type of data is a binary flag defining whether the location of a vehicle corresponds to a road work location. This binary flag is a construction yes/no flag that can be reported by sensor equipped vehicles traveling among a road network. The second type of data is a "start of construction" determination, that includes, for example posted signs, barricades, construction cones, construction barrels, or the like. Using the sensor equipped vehicle location at the time of detection of any of these objects and lateral/longitudinal offsets, accurate object locations can be identified. These objects can be used to define the start of construction or road work.

Figure 3:
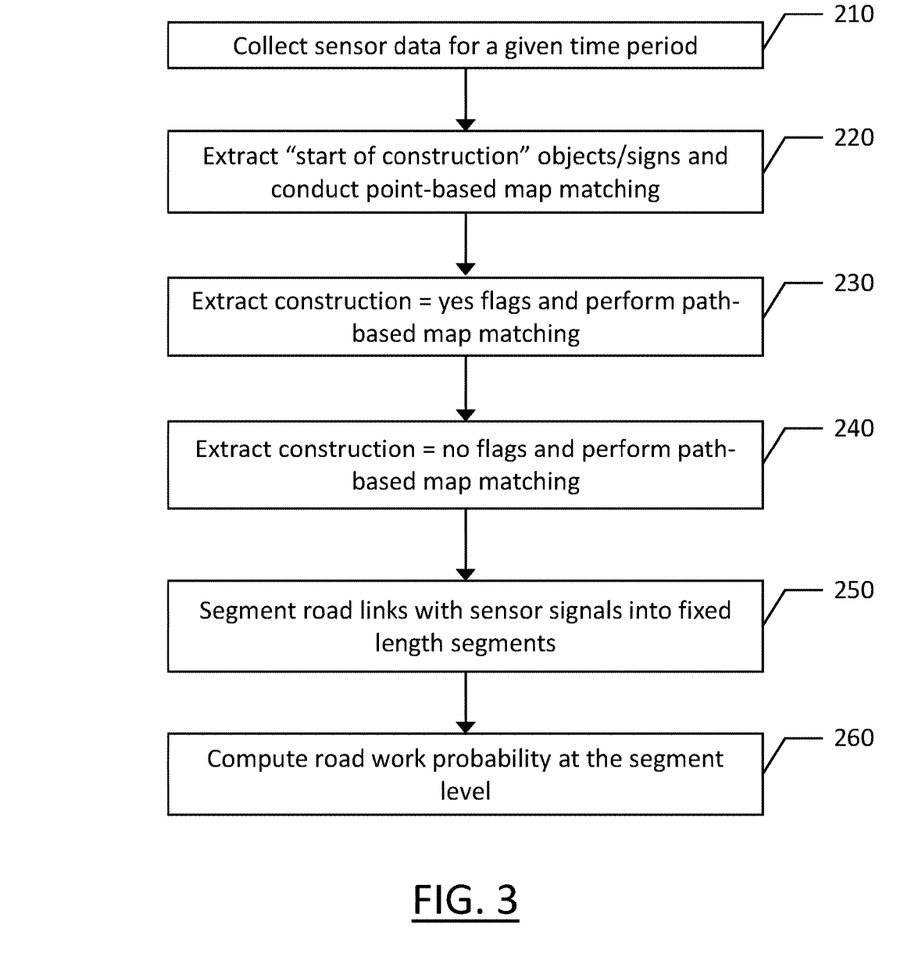
FIG. 3 is a flowchart of a method using vehicle sensor data to identify where road work exists within a road network according to an example embodiment of the present disclosure.

Using the "start of construction" data and the construction yes/no observations, embodiments derive the probability of road work being present along a road segment. An algorithm of example embodiments is depicted in the flowchart of FIG. 3. Sensor data is collected for a given time period at 210. The sensor data may be generated by vehicles traveling along road segments of the road network. The sensor data of example embodiments includes images from image sensors, LiDAR data, radar, or the like. The time period of an example embodiment is around 24 hours. However, the time period can vary. Sensor data collected along less-traveled road segments may require longer time period to gather sufficient sensor data to have an accurate estimate of road work. Similarly, high traffic road segments may collect data over shorter periods due to the abundance of available data.

The "start of construction" objects and signs are extracted from the sensor data at 220. These objects are detected in sensor data and include locations associated with their collection. Vehicles provide a location of the vehicle at the time of collection of sensor data including the "start of construction" objects and the estimated offset of the object from the location of the vehicle. This identifies an estimated location of the object, which is map-matched using a point-matching algorithm. The point-matching algorithm correlates the object to a position on or along a road segment.

Sensor data from vehicles traveling along a road segment further include a flag indicating whether construction is present. At 230, the "construction=yes" flags are extracted from the sensor data, and path-based map matching is performed. The path-based map matching correlates a position of the vehicle reporting the flag to a road segment and a position along the road segment. At 240, the "construction=no" flags are extracted from the sensor data and path-based map matching is similarly performed for these flags. This results in points along road segments where construction is positively reported as occurring and where construction is reported as not occurring.

The road links are segmented with sensor signals into fixed length segments at 250. This includes, in certain embodiments, segments of 50 meters or so, but may vary based on the volume and accuracy of sensor data. The last segment of a road link may be less than the fixed length. This segmentation enables embodiments to define road work along segments of a specific configurable spatial tolerance that can be further tuned with ground truth data. For each segment, the road work probability is computed based on the "start of construction" objects and the construction presence flags (yes/no). This provides a measure of the probability with which road work is reported along a road segment.

Beyond the probability of road work occurring is a confidence of road work occurring which incorporates a temporal factor. Road work confidence includes two components. The first is the probability factor that the road work is actually occurring at the reported location. The second is a time decaying factor for a lack of observations on a day (or other time period) where there were observations of road work on the time period prior. The function of variable and time is as follows:

$$p(\vec{v},t)=e-t/Tp(\vec{v})$$

where t is time, v is a set of input variables, and T is a parameter controlling how fast the probability decays. The parameter T should be configured using vehicle penetration. p(v) reflects confidence itself and is defined as follows:

$$p(\vec{v})=\Sigma w_i N(v_i)/\Sigma w_i N_{Ti}$$

Where $N(v_i)$ is a number of input signals at the segment, while $N_{Ti}$ is a total possible occurrence for each segment.

Before calculating $N(v_i)$, the input signals are transformed into Boolean values. Boolean values represent activities at segments. Where $w_i$ is a weight corresponding to the i-th input. Thus, weights are given to each input source that is used to compute the probability. To transform signals to Boolean representations, thresholds are used on the probability of each signal.

Objects that may be interpreted to indicate the start of construction include signs, where the signs may be static or variable signs. Static signs include signs such as "Work Zone" or "Lane Closed", for example. Variable signs include lighted signs, such as those presenting words, and those presenting symbols or instructions, such as a flashing arrow sign. Objects can also include barricades, cones, barrels, or the like. According to some example embodiments described herein, the detection of the beginning of a road work zone is based on a probability of a sign or object being present that signifies the "start of construction." For each segment of road within the road network, the number of positive observations are computed relative to the total number of vehicles that drove along the segment. If a threshold proportion of vehicles that drove along the segment reported positive observations of a "start of construction" object, the segment is established to include a start of a road work area.

A road segment is determined to have thereon road work if the construction zone binary flag is positive for construction work. Using the yes/no signals, for each segment, the number of positive (construction is present) observations relative to the number of total (positive (construction is present) and negative (construction is not present)) observations. If the number of positive observations relative to total observations satisfies a predetermined threshold, the road segment is established as having road work thereon. If the threshold is not satisfied, the road segment is established as not having road work thereon. According to some embodiments, there is a threshold above which a proportion of positive observations indicates road work present, and a lower threshold above which a proportion of positive observations indicates a possibility of road work. According to such embodiments, the degree of probability or the degree of confidence of the presence of road work may be conveyed to a driver/occupant of a vehicle or an autonomous vehicle, whereby action responsive to the road work and degree of probability and/or of confidence thereof can be taken.

Thresholds can be variable and can be established based on learned behavior of when thresholds correspond with ground truth observations. For example, a threshold can begin at 0.3 and can be improved with ground truth. Signals are computed only if there are at least a minimum number of vehicles having traversed a particular road segment. Weights are given to each input signal. Weights may be estimated initially and improved upon with ground truth. For example, the weight of a "start of construction" object detection may be 0.3 or 30%, while the weight of a construction zone flag (yes/no) is 0.7 or 70%. This weight can be varied based on specific location as certain countries, regions, localities may provide better signage or stronger indicators of the start of a construction zone. Ground truth observations to verify or discredit the "start of construction" data or the construction zone flag data can be used to adjust weights for different regions.

Figure 4:
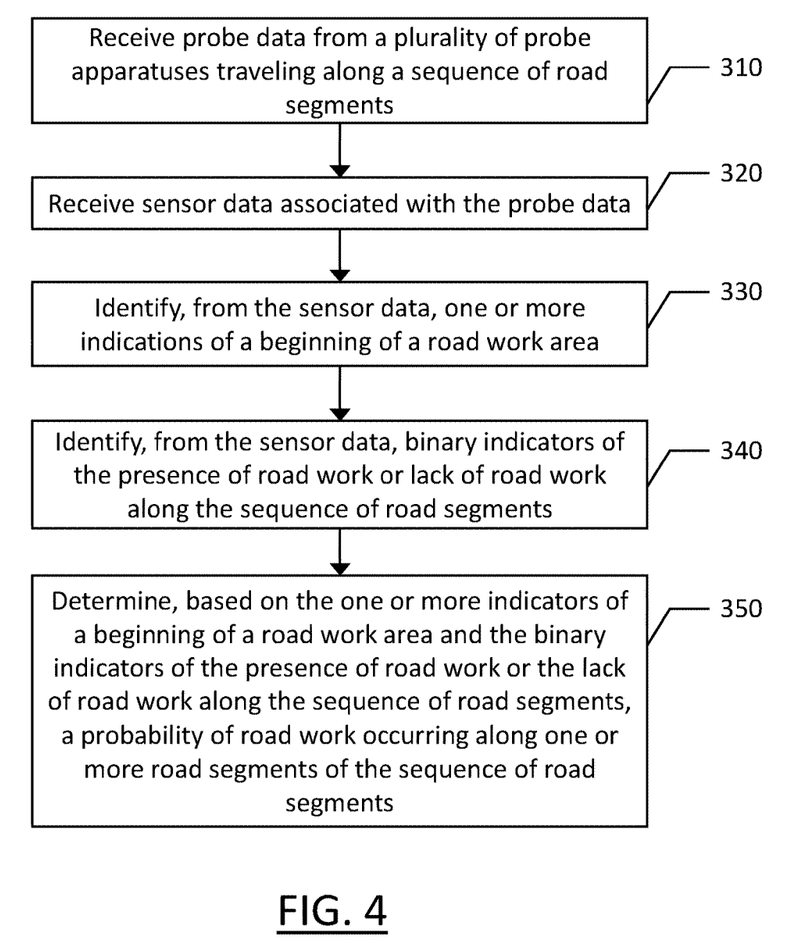
FIG. 4 is a flowchart of another method for using vehicle sensor data to identify where road work exists within a road network according to an example embodiment of the present disclosure.

FIG. 4 illustrates an example embodiment of an estimated probability of road work occurring on a road segment. As shown, the probability is zero or near zero and the interpretation is no road work is present when sensor signals from vehicles have signals indicating no road work (e.g., the construction zone flag is false or negative). When the probability is greater than zero, but less than 30%, there is a low chance of road work. This can occur when only "start of construction" objects are detected. This can include when start of construction objects are positioned near a road, but are not actively in use, such as before a road work event or after a road work event has concluded. When the probability is between 30% and 70%, there is a moderate chance of road work occurring. This can include signals indicating a positive construction zone flag exceeding reports of a negative construction zone flag. With a probability between 70% and 100%, there is a high likelihood of road work occurring on the road segment in question. This can occur when there are several "start of construction" objects observed and a relatively high proportion of positive construction zone flags.

The time decay of probability resulting in confidence includes when construction is observed in a first time period, but not in a subsequent time period. The confidence can be decayed at a rate with hysteresis to avoid jittering of the road work indication.

Upon determination of road work presence along a road segment, the road work event may be published. Road work events are created when the probability and confidence exceed a minimum threshold. This threshold can be OEM specific, with some OEMs wanting to be warned if there is any chance of road work. Other OEMs may want to be warned only if there is a high confidence that road work is occurring along a road segment.

Road segments within a road network may be classified according to the likelihood that road work is occurring along the respective road segment. This classification is, in certain embodiments, presented via a user interface displaying a map with road segments color coded according to their respective likelihood of having road work along them. Such a map can provide a user a visual method of identifying areas to avoid or to identify where traffic may be heavier than normal, even in the absence of dynamic traffic data or when predicting traffic for a future time.

FIGS. 3 and 4 are a flowcharts illustrative of methods according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 4 illustrates a method for using vehicle sensor data to identify where road work exists within a road network. Probe data is received from a plurality of probe apparatuses traveling along a sequence of road segments at 310. These probe apparatuses include, in some embodiments, sensor-equipped vehicles. The probe data includes location information, time stamp information, and sensor data. Sensor data from the probe apparatuses associated with the probe data is received at 320. From the sensor data, one or more indicators of a beginning of a road work area are identified at 330. From the sensor data, binary indicators are identified of the presence of road work or lack of road work along the sequence of road segments at 340. At 350, based on the one or more indicators of a beginning of a road work area and the binary indicators of the presence of road work or lack of road work along the sequence of road segments, a probability is determined of road work occurring along one or more road segments of the sequence of road segments.

In an example embodiment, an apparatus for performing the methods of FIGS. 3 and/or 4 above may comprise a processor (e.g., the processor 24) configured to perform some or each of the operations (210-260 and/or 310-350) described above. The processor may, for example, be configured to perform the operations (210-260 and/or 310-350) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 210-260 and/or 310-350 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least: receive probe data from a plurality of probe apparatuses traveling along a sequence of road segments; receive sensor data associated with the probe data, wherein the sensor data comprises data captured by sensors of the probe apparatuses along the sequence of road segments; identify, from the sensor data, one or more indicators of a beginning of a road work area; identify, from the sensor data, binary indicators of a presence of road work or a lack of road work along the sequence of road segments; determine, based on the one or more indicators of the beginning of a road work area and the binary indicators of the presence of road work or the lack of road work along the sequence of road segments, a probability of road work occurring along one or more road segments of the sequence of road segments; provide an indication of the probability of road work occurring along the one or more road segments of the sequence of road segments for at least semi-autonomous vehicle control; determine a confidence of road work occurring along the one or more road segments of the sequence of road segments based on the probability of road work occurring along the one or more road segments of the sequence of road segments and a time decay factor since the sensor data was collected; and cause an autonomous vehicle to cede control of the vehicle to a driver based on the indication of the probability of road work occurring along the one or more road segments of the sequence of road segments and the confidence satisfying a predetermined threshold.

2. Wherein causing the apparatus to determine, based on the one or more indicators of the beginning of the road work area and the binary indicators of the presence of road work or the lack of road work along the sequence of road segments, a the probability of road work occurring along the one or more road segments of the sequence of road segments comprises causing the apparatus to: determine, based on a proportion of the binary indicators of the presence of road work or the lack of road work along at least one road segment of the sequence of road segments indicating the presence of road work satisfying a predetermined threshold, a relatively high probability of road work occurring along the at least one road segment.

3. Wherein causing the apparatus to determine, based on the one or more indicators of the beginning of the road work area and the binary indicators of the presence of road work or the lack of road work along the sequence of road segments, a the probability of road work occurring along the one or more road segments of the sequence of road segments comprises causing the apparatus to: determine, based on a number of the one or more indicators of the beginning of the road work area satisfying a predetermined threshold relative to a total number of observations, a location of the beginning of the road work area along the sequence of road segments.

4. The apparatus of claim 1, wherein the one or more indicators of the beginning of the road work area comprises one or more of: a static sign, a variable sign, a construction cone, a construction barrel, or a construction barricade.

5. The apparatus of claim 1, further comprising causing the apparatus to: provide an indication of the probability of road work occurring along the one or more road segments of the sequence of road segments for at least one of navigational assistance or at least semi-autonomous vehicle control.

* * * * *